Feb. 21, 1950　　　　　S. V. JENNINGS　　　　　2,497,945
DIELECTRIC HEATING APPARATUS
Filed March 2, 1948　　　　　　　　　　　　　3 Sheets-Sheet 1

INVENTOR.
Sheldon V. Jennings
BY
*Woodcock and Phelan*
Attorneys

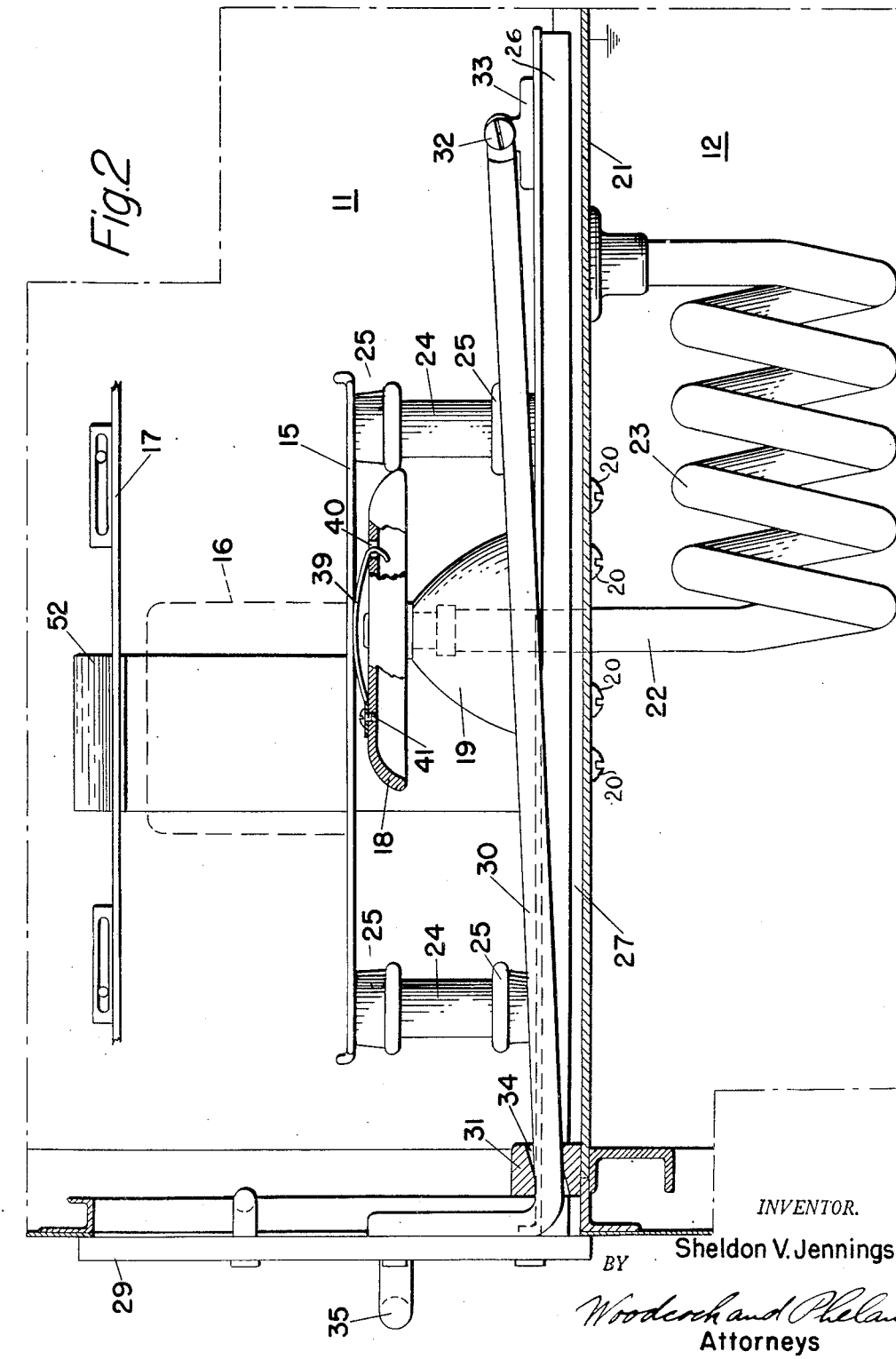

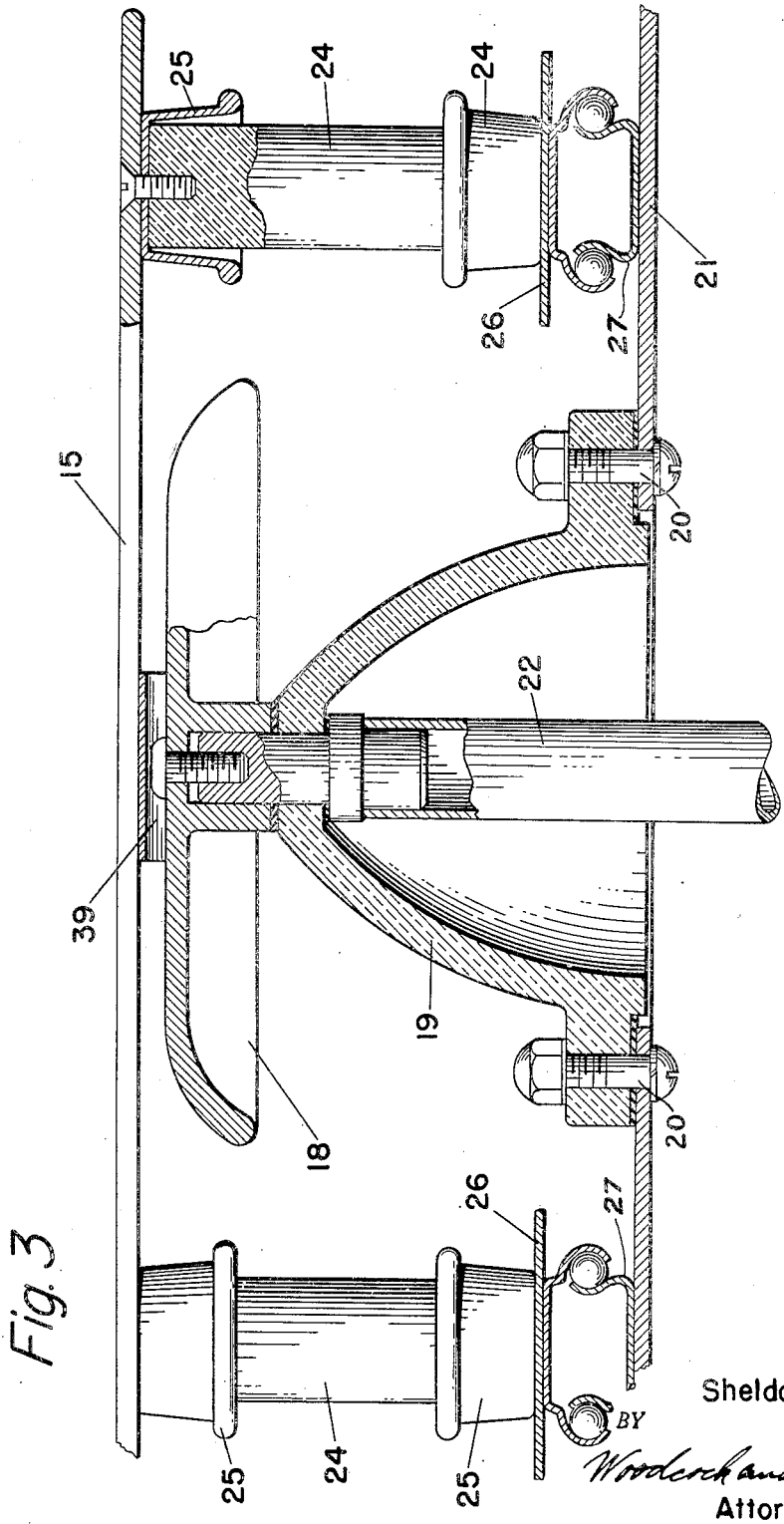

Patented Feb. 21, 1950

2,497,945

UNITED STATES PATENT OFFICE 2,497,945

DIELECTRIC HEATING APPARATUS

Sheldon V. Jennings, New Albany, Ind., assignor to The Girdler Corporation, Louisville, Ky., a corporation of Delaware Application March 2, 1948, Serial No. 12,603

8 Claims. (Cl. 219—47)

This invention relates to high-frequency heating systems in which a load comprising one or more dielectric objects is disposed upon a tray electrode and moved with it into a heating compartment to a position below a second heating electrode.

In accordance with the present invention, the load tray comprises a reciprocable carriage or mount for the lower electrode, and the front wall of the tray is pivotally connected to the carriage by side rods, or equivalent, which upon withdrawal of the tray for loading or unloading coact with guides to swing the tray-front below the plane of the tray electrode for ready access thereto and which upon re-insertion of the carriage coact with the guides to raise the tray-front to compartment-closing position.

More specifically, the side rods are pivotally connected to the rear portion of the carriage and the guides therefor are adjacent the front of the heating compartment to serve as stop structure defining the forward position of the tray carriage and the lowered position of the tray-front.

The invention further resides in features of construction, combination and arrangement hereinafter described and claimed.

For a more detailed understanding of the invention and for illustration of preferred forms thereof, reference is made to the accompanying drawings in which:

Fig. 2 is a side view, partly in section, showing the relative position of parts appearing in Fig. 1 with the tray in heating position; and Fig. 3 is an end view, partly in section, of components appearing in Figs. 1 and 2.

Figure 1:
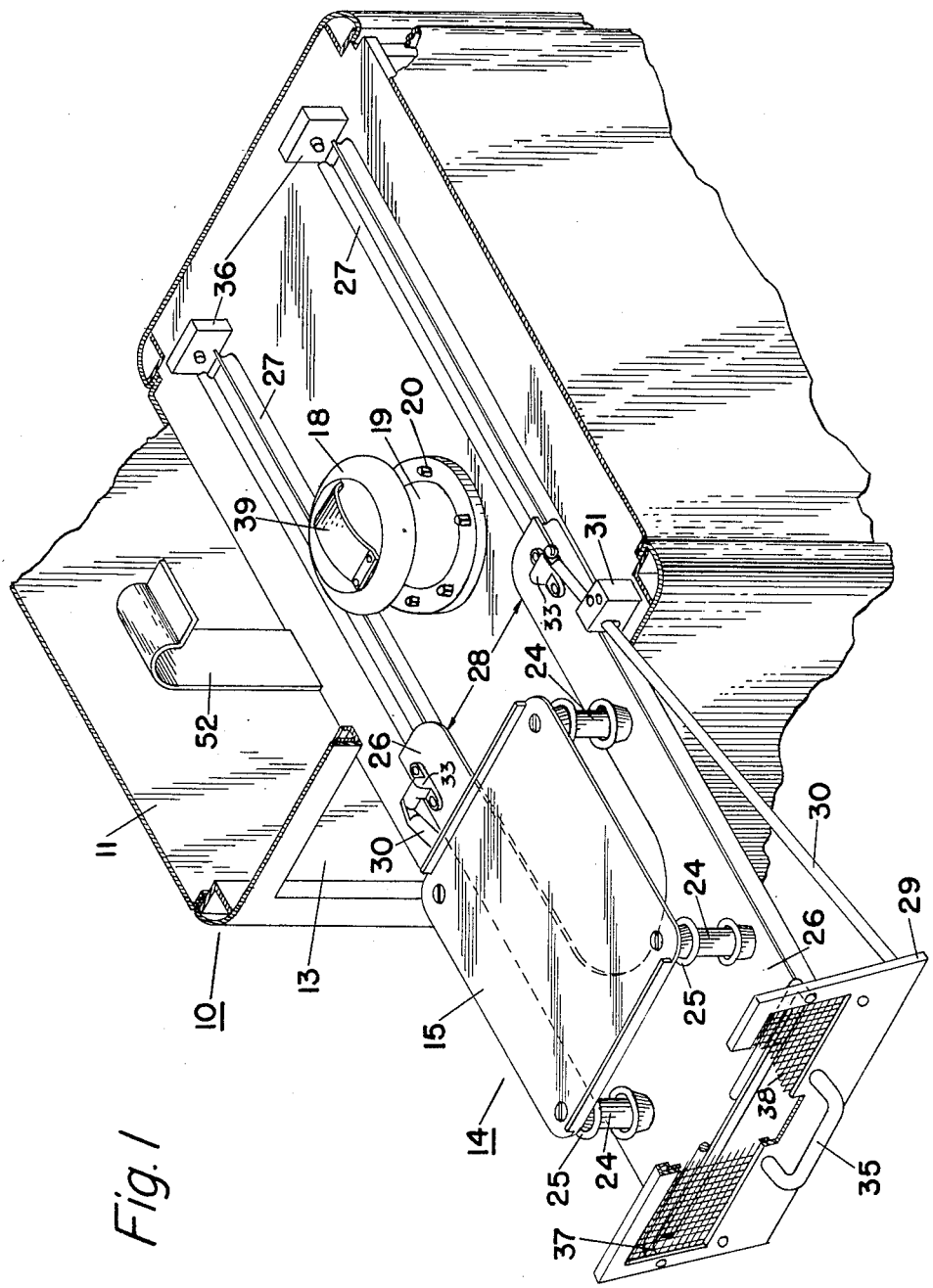
Fig. 1 is a perspective view, with parts broken away, showing the loading tray in retracted position and associated parts of the dielectric heating unit.

Referring to Figs. 1 and 2, the dielectric heating unit comprises a cabinet or housing 10 usually and preferably formed of sheet metal attached to and supported by a metal angle framework. The top portion of the cabinet shown comprises a heating compartment 11 and a compartment 12 directly below it in which is disposed the high-frequency generating equipment. The front wall of the heating compartment 11 is provided with an opening 13 for insertion and withdrawal of a load tray 14 with which is movable an electrode plate 15 for supporting the dielectric load 16 which may, for example, consist of one or more preforms of plastic material to be preheated for disposition in a molding press upon attainment of a desired temperature.

With the load tray in the inserted or heating position, Fig. 2, the dielectric load 16 is subjected to the high-frequency field between the plate 15 and an upper electrode 17 mounted within the upper portion of the heating compartment and electrically connected to the metallic wall structure thereof as by grounding straps 52.

With the tray electrode 15 in the "in" or heating position shown in Fig. 2, it is effectively connected to the high-voltage terminal 18 supported at the upper end of a feed-through insulator 19 which is suitably secured at its lower end, as by bolts 20, to the metal partition 21 between the compartments 11 and 12. The lead 22 extends from terminal 18 through the insulator 19 into the lower compartment 12; it is there connected to or forms a continuation of the high-frequency tank coil 23 whose other end or terminal is connected to the metal partition 21 or other suitable ground point. There is thus afforded a short connection from the high potential end of the tank coil 23 to the heating electrode 15 which insures concentration of the tank-circuit inductance in coil 23. The minimizing of the lead inductance reduces the tendency for generation of oscillations at other than the desired mode of the associated oscillator. In addition, there is afforded a more compact arrangement of the components.

The tray electrode 15 is mechanically attached by a plurality of post insulators 24, each of which is preferably provided with corona caps 25, to the carriage 26 of the load tray 14. The carriage 26 is guided and supported by the rail members 27 suitably attached to the partition 21 and may be formed of a sheet metal plate having at its rear edge a cut-away portion or slot 28 sufficiently wide to clear the feed-through insulator 19 and sufficiently long to permit the carriage to be pushed to its full "in" position, Fig. 2, without obstruction by the insulator. Throughout the range of movement of the carriage 26, from "in" position (Fig. 2) to "out" position (Fig. 1), the tray electrode 15 moves parallel to the plane of the upper heating electrode 17. As the tray electrode remains horizontal during its movement, there is little tendency for the load to shift its position during movement of tray 14 into or out of the heating compartment 11.

To facilitate and expedite loading and unloading, the front wall 29 of the tray, which serves as a door closing the opening 13 of the upper heating compartment 11 when the tray is in the heating position, is dropped to the position shown in Fig. 1 as the tray is retracted from compartment 11. As shown in Fig. 1, the upper edge of the front wall 29 drops below the plane of the electrode 15 so that an operator, without obstruction by the front wall 29, may readily load or unload the tray electrode. Moreover, and as shown, the tray 14 has no side walls which could obstruct loading or unloading. In brief, when the tray is retracted for loading or unloading, the heating electrode 15 is entirely in the clear and accessible from the front or either side of the tray.

Preferably, and as shown in Figs. 1 and 2, the front wall 29 of the tray 14 is connected to the rear portion of carriage 26 by a pair of rods or bars 30 attached at their forward ends to the front wall 29 and respectively extending through the guide blocks 31 attached within the upper heating compartment 11 adjacent the lower corners of the front opening 13. Each of the rods 30 is pivotally connected to the carriage 26 near the rear edge thereof well below and remote from the "hot" electrode 15 and from the high-potential terminal 18; specifically, the rear end of each of the rods 30 is pivoted upon a pin 32 extending from a bearing bracket 33 attached to carriage 26. The opening 34 in each of the two fixed guide blocks 31 is so shaped, Fig. 2, that as the tray 14 is pulled outwardly by the handle 35 attached to the front wall, the rods 30 pivot about the pins 32, allowing or forcing the front wall 29 to drop to the position shown in Fig. 1. Conversely, when the tray 14 is pushed back into the heating compartment, the openings 34 of blocks 31 serve as cams raising the front wall 29 to the compartment-closing position shown in Fig. 2. The guide blocks 31 also serve as stops preventing the tray from accidentally being pulled so far forward that it would fall out of the housing 10 and undesirably dump the load; they also serve as stops limiting the extent to which the tray-front may drop. As shown in Fig. 2, the side bars 30, or equivalent, are below the lower electrode 15 and, in fact, lie close to the grounded plate 21 so that they are well out of the field between electrodes 15, 17. With the loading tray in its heating position, Fig. 2, it is preferably provided that the rear edge thereof engages one or more safety switches 36, Fig. 1, which unless the tray is in such position preclude energization of the high-frequency generating equipment in the lower compartment 12 of the housing. With the tray in heating position, the raised front 29 protects the operator from touching or reaching dangerously close to the tray electrode 15 which is now at high potential with respect to ground because of its engagement with, or proximity to, the excited high-voltage terminal 18, or equivalent.

As the electrode 15 is electrically isolated by insulators 24 from carriage 26, the rods 30, front panel 29 and handle 35 are all at ground potential and consequently may be touched by the operator at any time without danger of injury or shock. When the tray is withdrawn from the heating compartment, the tray electrode 15 passes out of engagement with, or proximity to, the high-potential terminal 18, and, consequently, preforms or other load objects 16 may be placed thereon or removed therefrom without possibility of shock or injury even though the high-frequency generating equipment is not de-energized due to absence or failure of tray switches 36, or equivalent. Preferably, the front wall 29 of the tray is provided with a window 37, suitably covered with a guard screen 38, to permit an operator to view the interior of the heating compartment in checking for flashover or other incidents of improper operation.

In the particular arrangement shown in Figs. 1 to 3, there is attached to the upper face of the corona shield 18 a leaf spring contact 39 which conductively connects the "hot" electrode 15 to the high-potential lead 22. As shown in Fig. 2, the free end of the spring may pass through an opening 40 in the terminal 18 with the tip of the spring bent to serve as a stop, limiting the upward movement of the leaf spring under its own resiliency when the tray is retracted from the heating compartment. The other end of the leaf spring 39 may be secured by any suitable means, such as machine screws 41, to the high-voltage terminal 18.

In other arrangements of the "hot" electrode also described and claimed in co-pending application Serial No. 11,560 of a co-worker, the leaf spring 39, or equivalent, is omitted and there is no conductive connection between the tray electrode 15 and the high-voltage terminal supported by the feed-through insulator 19. Instead, when the tray is in the heating position, it, together with the high-frequency terminal, forms a condenser in series with the capacity between the heating electrodes 15 and 17. Preferably, in such case, the corona shield is of suitably enlarged area to afford the desired coupling capacity.

In both modifications it is desirable, as shown in the aforesaid application Serial No. 11,560 to provide for adjustment of the grounded electrode 17 toward and away from the plane of the tray electrode 15 so to accommodate the system for heating of different loads or to control the rate of heating. In these and other generally similar arrangements, the drop-front of the tray 14 automatically falls below the plane of the "hot" electrode 15 when the tray is pulled out from the high-frequency heating compartment 11 and automatically rises to close the compartment window 13 as the tray is pushed in to position the load 16 below the grounded upper electrode 17 and to connect the "hot" electrode to the high-potential terminal 18, or equivalent.

It shall be understood the invention is not limited to the specific arrangement disclosed and that changes and modifications may be made within the scope of the appended claims.

What is claimed is:

1. Dielectric heating apparatus comprising a compartment, a grounded upper heating electrode within said compartment, a load tray comprising a carriage and a lower heating electrode mechanically connected thereto and electrically insulated therefrom, a front tray wall for closing said compartment when said tray is disposed therein, structure pivotally connecting said front wall to the rear of said carriage, and guides engaging said structure to effect dropping of said front wall below the plane of said lower heating electrode as said tray is retracted from said compartment.

2. Dielectric heating apparatus comprising a compartment, an upper heating electrode within said compartment, a load tray comprising a carriage and a lower heating electrode supported thereon, a front tray wall, structure extending from the lower part of said front tray wall pivotally to connect it to said carriage rearwardly of said lower heating electrode, and stationary guide structure engaging said structure to drop said front wall below the plane of said lower heating electrode as said tray is retracted from said compartment and to raise said front tray wall to close said compartment as said tray is moved into it.

3. Dielectric heating apparatus comprising a compartment, an upper heating electrode therein, a carriage slidable into and out of said compartment, a lower heating electrode mounted upon said carriage for supporting a dielectric load, fixed guides at opposite sides of said compartment, rods pivotally connected to the rear of said carriage and extending along opposite sides thereof and through said guides, and a front wall attached to the forward ends of said rods in front of said guides which are shaped to effect pivotal movement of said rods to drop said wall below the plane of the lower heating electrode as the carriage is moved in one direction out of said compartment and to raise said front wall to compartment-closing position as said tray is moved in reverse direction.

4. Dielectric heating apparatus comprising a compartment, upper and lower heating electrodes both within said compartment for dielectric heating of a load between them, a front wall for closing said compartment and having a window for viewing said load during heating, a slidable carriage upon which said lower electrode is mounted, fixed guide members at opposite sides of and near the front of said compartment, and means for dropping said front wall below the plane of said lower electrode as said carriage is withdrawn from said compartment and for returning said front wall to compartment-closing position for reverse movement of said carriage comprising members pivotally connected to said carriage and extending through said guide members for attachment with said front wall.

5. Dielectric heating apparatus comprising a compartment, an upper heating electrode therein, a carriage slidable into and out of said compartment below and parallel to said upper electrode, a lower heating electrode mounted upon said carriage, a front wall for said compartment pivotally connected to said carriage by members extending from said wall to the rear of said carriage, and guides within said compartment engaging said members to define the foremost position of said carriage for loading and unloading thereof and for dropping said front wall below and for raising it above the plane of said lower electrode as said carriage is respectively moved to and from said position.

6. Dielectric heating apparatus comprising a compartment, an upper heating electrode therein, a carriage having a lower heating electrode thereon slidable from a first position for which said lower electrode is below said upper electrode to a second position for which said lower electrode is outside said compartment, a front wall for closing said compartment when said carriage is in said first position, members for pivotally connecting said front wall to the rear portion of said carriage, and guides coacting with said members to drop said front wall below the plane of said lower electrode as said carriage is moved from said first to said second position.

7. Dielectric heating apparatus comprising a compartment, an upper grounded electrode therein, a high-potential terminal within said compartment, a slidable carriage having mounted thereon and insulated therefrom a lower heating electrode which for one limiting position of said carriage is outside of said compartment for loading and unloading of work and for a second limiting position of the carriage is between said upper electrode and said terminal for heating of the work, a front wall for closing said compartment when said carriage is in said second position, guides within said compartment near the forward lower corners thereof, and members extending from the lower portion of said front wall through said guides for pivotal connection to the rear portion of said carriage, said members and guides effecting lowering of said front wall for access to said lower electrode from the front and sides as the carriage is moved to said one limiting position and for raising the front wall to its compartment-closing position as said carriage is moved to said second limiting position.

8. Dielectric heating apparatus comprising a compartment, an upper heating electrode therein, a carriage slidable into and out of said compartment, a lower heating electrode mounted upon said carriage for supporting a dielectric load, a front wall for said compartment, members extending from said front wall into said compartment below said lower electrode for pivotal connection to said carriage below said lower electrode, and guides engaging said members to effect movement thereof in paths below said lower electrode as said carriage is moved into and out of said compartment, said movement of said members effecting raising and lowering of said front wall.

SHELDON V. JENNINGS.

REFERENCES CITED

The following references are of record in the file of this patent:

Plastics, August 1947, page 31.